L. PONDELICK.
PISTON RING.
APPLICATION FILED MAR. 25, 1915.
1,209,882.
Patented Dec. 26, 1916.
2 SHEETS—SHEET 1.
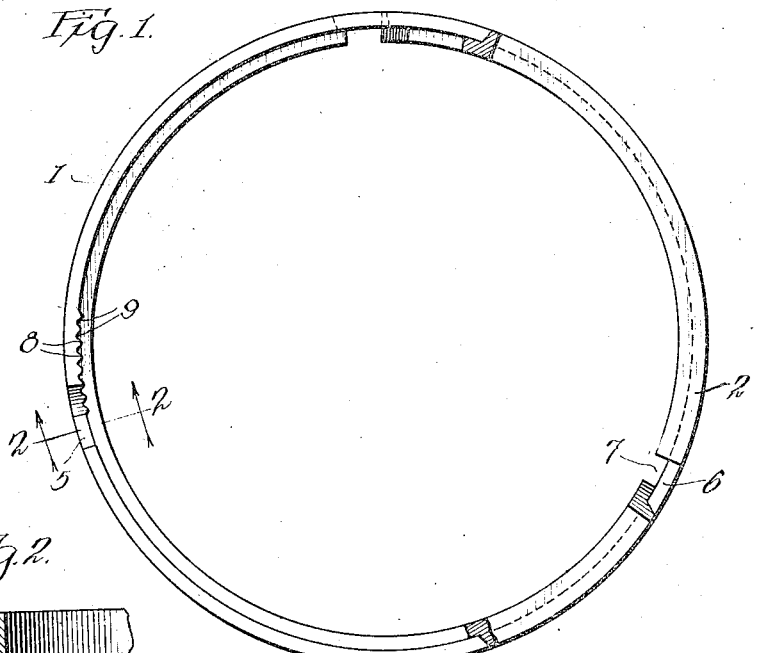
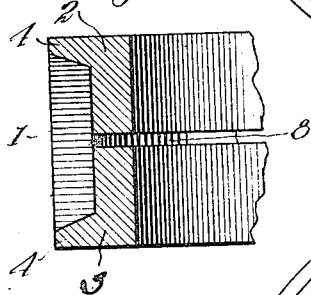
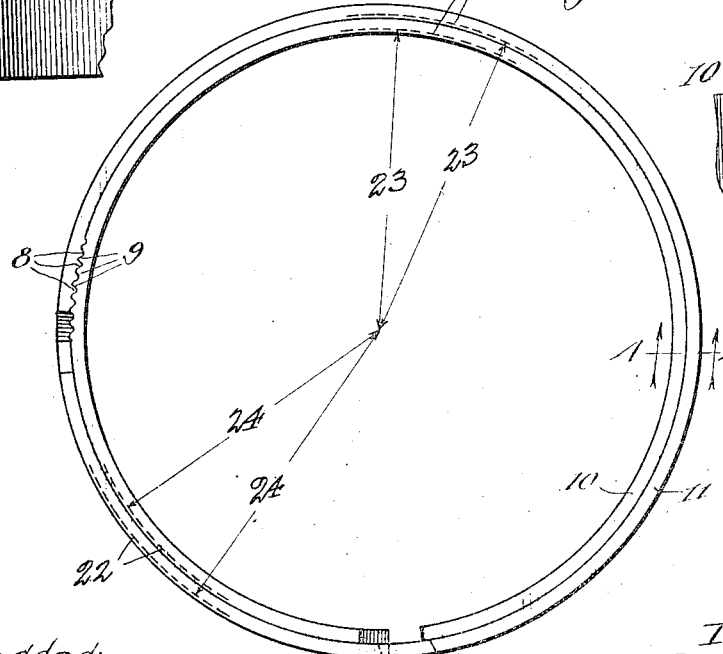
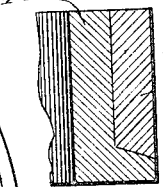
Witnesses:
Leo J. DuMais.
W. K. Olson.
Inventor:
Leo Pondelick
By Rudolph M. Wolf, Atty.

L. PONDELICK.
PISTON RING.
APPLICATION FILED MAR. 25, 1915.
1,209,882.
Patented Dec. 26, 1916.
2 SHEETS—SHEET 2.
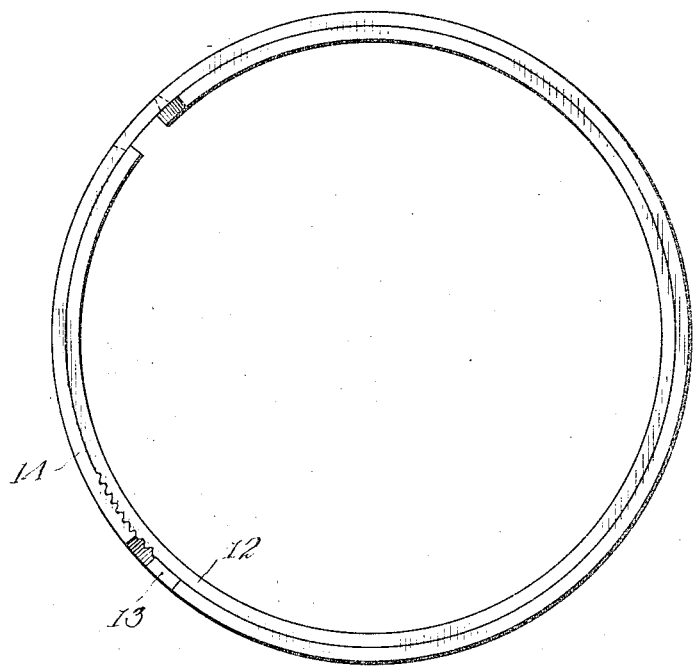
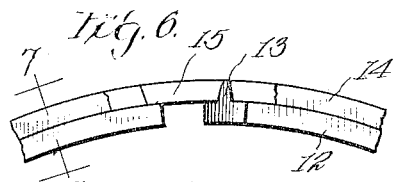
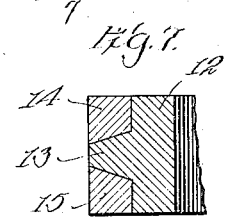
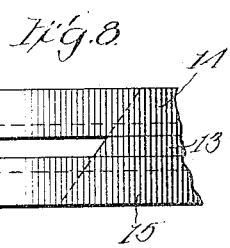
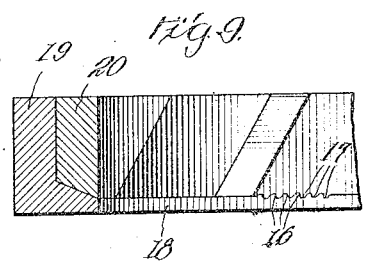
Witnesses:
Leo J. Dumais
W. K. Olson
Inventor
Leo Pondelick
By Rudolph M. Fox Atty.

UNITED STATES PATENT OFFICE.

LEO PONDELICK, OF CHICAGO, ILLINOIS.

PISTON-RING.

1,209,882.  Specification of Letters Patent.  Patented Dec. 26, 1916.

Application filed March 25, 1915. Serial No. 16,961.

*To all whom it may concern:*

Be it known that I, LEO PONDELICK, citizen of the United States, residing at Chicago, in the county of Cook and State of Illinois, have invented certain new and useful Improvements in Piston-Rings; and I do hereby declare the following to be a full, clear, and exact description of the invention, such as will enable others skilled in the art to which it appertains to make and use the same.

My invention relates to metallic packing rings, and more particularly to rings suitable for use in producing fluid-tight joints between pistons and the cylinders housing the same, or between piston rods or valve stems and the cylinder heads or other wall portions through which the said rods or stems are slidable when in action. In packings of this kind, the use of a single-piece resilient ring involves a gap between the ends of the ring, which gap will permit a leakage of steam, air or other fluid between the members separated by the packing ring. To avoid such a leakage, it has been customary heretofore to construct such packing rings out of a number of associated annular members having the gaps between the respective ends of the several members disposed out of alinement with each other, and having a flange portion upon at least one of the members overlapping and effectively closing the gap between the ends of the associated annular member. Such a construction is shown in my copending application for self-adjusting piston rings, filed February 16, 1914, as Serial No. 818,962, in which the preferable construction comprises three rings associated with each other, and having the gaps of the respective rings circumferentially separated from each other.

In practice, I have found that with composite packing rings the vibration of the various parts, together with the tendency toward a circumferential motion caused by the expanding and contracting of the various ring members during the reciprocation of the associated piston or rod, often causes these rings to crawl with respect to each other. Consequently, when such composite rings have been in use for some time, it may easily happen that the gaps in at least two of the constituent members will be substantially in alinement with each other, thereby permitting a leakage of the fluid through this portion of the packing ring.

The prime object of my present invention is to provide a packing ring in which the constituent members will be effectively locked against such relative circumferential motion or crawling, but in which said members will still be free to expand or contract according to the strains placed upon the same when in effective operation.

Other objects of the invention are: First: To provide a packing ring for pistons or the like in which the means provided for maintaining the several constituent members of the ring non-rotatable relatively to each other are integral with the several members and are so formed as not to weaken the same at any point whereby their expansion and contraction in service is maintained uniform over their entire circumference. Second: To provide a packing ring consisting of a plurality of concentric members equipped with interlocking formations to prevent their relative rotation so located and disposed as to be entirely out of reach of the cylinder walls, and in which said interlocking formations are relatively disposed to maintain the gaps in the constituent members separated by an arc less than one hundred eighty degrees whereby to prevent flattening of the ring under contracting pressure applied on the exterior or wearing surface thereof. Third: To provide a packing ring of the character set forth in which the normal diameter of the outer constituent member is less than the normal diameter of the inner ring, whereby to cause the same to closely embrace said inner ring, and in which the interengaging formations for preventing relative rotation of said rings are formed at one side of and contiguous to the gap in one of said rings and at a point sufficiently removed from the gap in the companion ring to effectively separate said gaps, whereby the interengaging formations may be made of minimum depth.

While my invention may be applied to packing rings of widely varying types, its principle will be readily seen from the several embodiments shown in the accompanying drawings, in which:

Figure —1— is a fragmentary plan view of a three-piece packing ring embodying my invention. Fig. —2— is a transverse section of the same on the line 2—2 of Fig. —1—. Fig. —3— is a view similar to Fig. —1— of a two-piece ring embodying my invention. Fig. —4— is a transverse section of the same on the line 4—4 of Fig. —3—. Fig. —5— is a view similar to Fig. —1— showing a three-piece ring embodying my invention. Fig. —6— is a fragmentary detail view similar to Fig. —5— showing the gap portion of the inner or carrying ring. Fig. —7— is a transverse section on the line 7—7 of Fig. —5—. Fig. —8— is a fragmentary detail view in side elevation of the ring showing the gap in the carrying ring. Fig. —9— is a fragmentary view in side elevation of a piston ring showing a modified embodiment of my invention.

While my invention may be applied to packing rings comprising any desired number of constituent members, it is shown in Figs. —1— and —2— of the drawings as applied to a three-part ring comprising an outer member 1 surrounding and partially housing a pair of inner members 2 and 3 provided with annular flanges 4. Each of these component members is an annular split ring of a material possessing some degree of resilience, cast iron being found entirely suited to the purpose and very advantageous because of its porosity. The diameters of the inner and outer members are such that the periphery of the cylindrical portion of both inner members will normally bear against the bore of the outer member 1. When the members are assembled, the gaps in their respective ends are placed out of alinement with each other and preferably spaced at a considerable distance from each other circumferentially of the packing ring. Thus in Fig. —1—, the gaps in the respective rings 1, 2, and 3 are respectively indicated at 5, 6 and 7. To prevent the said rings from crawling with respect to each other during the rapidly repeated expansion and contraction to which they are subjected when in service, thereby causing two or more of the gaps to aline with each other and consequently permitting a leakage through the packing ring, I equip the main member 1 upon a portion of its bore with teeth 8 extending substantially parallel to the axis of the ring. I likewise equip the members 2 and 3 respectively, with similarly disposed teeth 9 positioned upon the portion of their peripheries which will be opposite said teeth 8 on the outer member when the ring is assembled. In practice, both the expanding and compressing actions to which the ring is subjected will tend to force the teeth 8 upon the outer ring simultaneously into engagement with the teeth 9 upon the two inner members, thereby interlocking the said members against relative circumferential movement. Consequently, even a prolonged use of such a packing ring will not permit the members thereof to crawl upon each other until their gaps aline and afford a leakage passage. While the portion of each ring equipped with the coöperating projections (such as the teeth 8 and 9) may be varied considerably, I preferably form such teeth only upon a relatively small portion of each ring, thereby permitting members to present smooth and substantially cylindrical surfaces which will readily slide upon each other. Consequently, the interlocking feature of my invention will not interfere with the ready expansion and contraction of the respective members. The interlocking formations are readily placed upon the rings by applying a knurling wheel to the same and the shape of the said formations may be varied considerably, although I have found the relatively shallow effect, which may readily be produced by a knurling wheel, to be ample. It will be obvious that with the type of packing ring shown in the drawings, the interlocking provisions will not interfere with the effect produced by the conically disposed flanges upon the inner and outer members, as more particularly explained in my copending application heretofore mentioned.

The invention may also be embodied in other structures as shown in Figs. —3— to —9— inclusive. Thus for example, as shown in Figs. —3— and —4—, the ring is a two-piece ring and comprises substantially one-half of the structure shown in Figs. —1— and —2—, the inner or carrying ring 10 being substantially identical in shape with the ring 2 and the outer ring being substantially one-half of the ring 1 in cross section. Rings of this character are most commonly used, and, as will be seen, are identical in construction with the structure of Figs. —1— and —2—, to the extent above indicated. The invention may also be embodied in the three-piece ring of the construction shown in section in Fig. —7—, the inner ring 12 being provided with a central annular outwardly projecting tapered rib 13 upon the opposite faces of which the outer rings 14 and 15 rest. In action this structure is practically indentical with that of Figs. —1— to —4— inclusive. It will further be seen that in all of these structures the nurling on the inner face of the outer ring or rings begins at one side of the gap in such ring and extends for a short distance from said gap. On the inner ring the knurling is effected on the face opposing the knurled face of the outer ring at a point substantially ninety degrees removed from the gap in said inner ring, whereby the gaps in said rings are maintained substantially ninety degrees removed from each other. This particular relative arrangement I have found to be most efficient especially in the two-piece rings shown in Figs. —3— and —4— for the reason that if the gaps in the two rings are diametrically opposed it brings the weakest portions of the rings directly opposite each other and upon the application of a contracting pressure such as is exerted by the wall of the cylinder of an engine the tendency is to flatten the rings at these points, that is to say, they do not contract into a perfect circle. By removing the gaps ninety degrees from each other the weak portions are differently distributed, and I have found that in this arrangement the tendency to contract circularly instead of what might be termed slightly elliptically, is greater, and a more perfect fit or contact of the entire circumferential wall of the piston ring with the wall of the cylinder is assured.

Similarly in the three-piece rings, shown in Figs. —1— and —2—, and Figs. —5— to —8— inclusive, it is preferable to distribute the gaps in the rings so as to remove them at least ninety degrees from each other, and preferably so that the three gaps become disposed about one hundred twenty degrees from each other, as this effects a distribution of the weak points over the entire circumference in such a manner as to cause the composite ring to maintain its true circular shape under contraction. In order to insure a constant inter-engagement of the knurled or inter-engaging formations on the opposed annular faces of the rings, I have also found it preferable to make the inner or carrying ring, which is of greatest cross-sectional area and, therefore, of greatest rigidity, slightly larger than would be normally necessary, and make the outer ring normally slightly smaller than required, so that in mounting the smaller or outer ring upon the larger or carrying ring, said lighter ring will be expanded by the heavier ring, and the latter will be slightly contracted by the lighter ring. This will cause the two rings to hug each other very closely and serves particularly to cause the interengaging formations to acquire such a hold upon each other as will absolutely prevent a relative rotation of said rings or ring members. This is further advantageous in that it will permit the inter-engaging formations to be made very shallow without danger of permitting the relative rotation referred to. These structural characteristics are common to all of the aforesaid structures, and these may be further modified by increasing the number of constituent ring members and their relative disposition without departing from the invention. The most essential feature of the latter is the position of inter-engaging formations on opposed faces thereof which are integral with the respective members, and are so made or of such a character as to preclude the weakening of said members at any point, and a further very essential feature of the invention is to locate these inter-engaging formations upon those opposed faces of the constituent ring members which will most readily insure a constant inter-engagement of said formations, and where they will be subjected to the least wear in service.

In Fig. —9— I have illustrated a modified embodiment of the invention in which the inter-engaging formations 16 and 17 are formed on the face of the flange 18 of the carrying ring 19 and the opposed edge of the inner ring 20 but I do not regard this embodiment as being as advantageous as those illustrated in Figs. —1— to —8— inclusive.

Referring again to Fig. —3— it will be noted, that as therein illustrated by the dotted arcs 21—21 and 22—22 respectively, that the normal radius of the inner or carrying ring 10 is slightly greater, and that of the ring 11 is normally somewhat less than the radii shown in full lines in said figure. This necessitates a contraction of the ring 10 and expansion of the ring 11 in mounting the latter upon the former and causes said rings to very closely embrace each other so that the inter-engaging formations 8 and 9 will be maintained securely engaged with each other. This is very important as, in order that said formations may not weaken the rings they must be very minute and shallow, in fact so small as to preclude other than exaggerated illustration thereof in the drawings. The radial lines 23—23 indicate the substantially normal inner and outer radius respectively of the body portion of the ring 10, and the similar lines 24—24 indicate the substantially normal inner and outer radius respectively of the ring 11. This feature will be common to all of the structures illustrated.

I claim as my invention:

1. In a packing ring, the combination with a pair of split annular members, one thereof substantially encircling the other thereof, of means for preventing relative circumferential motion of said members, said means comprising relatively intermeshing, minute, integral teeth extending substantially parallel to the common axis of the said members and disposed upon opposed substantially cylindrical surfaces of the respective members.

2. A packing ring including an annular member equipped at one end with a flange extending radially outward of the main portion of said member, and a second annular member encircling the main portion of the first-named member, said flange and the adjacent end of the second member presenting smooth opposed surfaces disposed conically about the common axis of the said members, the periphery of the main portion of the first member and the bore of the second member equipped with relatively intermeshing teeth disposed substantially parallel to the common axis of the said members.

3. A packing ring comprising a plurality of parts including main and auxiliary split annular members, the former encircled by the latter and each having a portion of its periphery equipped with teeth, all of said teeth extending substantially parallel to the common axis of the said members and each group thereof disposed adjacent to the gap therein and one side thereof, the teeth of all of said members interengaging to restrict the maximum relative circumferential motion of said main and auxiliary members with respect to each other substantially to that end portion of each of said members which is circumferentially farthest removed from the point of its interengagement with its companion member.

4. A packing ring comprising a pair of concentric split rings having contacting cylindrical surfaces each provided with a set of very minute teeth integral therewith and extending through a very short arc, the respective sets of teeth adapted to interengage to prevent relative rotation of said rings.

5. A packing ring comprising a pair of concentric split rings having contacting annular surfaces, each of the latter provided with sets of minute integral teeth extending through relatively short arcs thereof and adapted to interengage for preventing relative rotation of said rings, said sets of teeth held in engagement with each other by yielding pressure of the contacting surfaces against each other in a direction substantially radially of the rings.

6. A packing ring comprising a plurality of relatively interfitting concentric elastic split rings, and integral means confined to comparatively short opposed arcs of contacting opposed curved surfaces of said rings for holding the same against relative rotation, said means disposed relatively to the gaps in said rings to maintain said gaps out of register with each other.

7. A packing ring comprising a plurality of relatively interfitting concentric elastic split rings, and minute, integral means on contacting opposed surfaces of said rings for holding the same against relative rotation, said means restricted to a relatively small portion of said opposed surfaces and disposed relatively to the gaps in said rings to maintain said gaps out of register with each other and relatively disposed out of diametric alinement with each other, whereby to prevent said ring becoming elliptical under contracting pressure exerted thereon.

8. A piston ring comprising companion split rings, one thereof constituting the carrier for the other, the latter being normally of a diameter requiring expansion thereof to receive the carrying member, said respective members equipped with integral interengaging formations on one portion of their meeting faces maintained in engagement with each other by the close embrace due to the expansion aforesaid.

9. A piston ring comprising companion split rings having contacting cylindrical annular faces, the latter equipped with relatively minute interengaging formations for preventing rotation of said rings relatively to each other.

10. A piston ring comprising companion split rings having contacting curved annular faces, the latter equipped with relatively minute interengaging formations integral with the respective rings for preventing rotation of said rings relatively to each other.

11. A piston ring comprising companion split rings having contacting cylindrical annular faces, the latter equipped with relatively minute interengaging formations of less depth than the thickness of said rings and integral with the latter for preventing rotation of said rings relatively to each other.

12. A piston ring comprising companion split rings, one thereof constituting the carrier for the other, the latter being normally of a diameter requiring expansion thereof to receive the carrying member, said respective members equipped with minute integral interengaging formations on their meeting faces maintained in engagement with each other by the close embrace due to the expansion aforesaid.

13. A piston ring comprising companion split rings having contacting cylindrical annular faces, the latter equipped with relatively minute interengaging formations extending through, a relatively short arc to provide interengagement at substantially one point only in the contacting surfaces, whereby to provide freedom of expansion of the remaining portions.

In testimony whereof I have signed my name in presence of two subscribing witnesses.

LEO PONDELICK.

Witnesses:
R. W. LOTZ,
M. M. BOYLE.